US012003259B2

(12) United States Patent
Deforge et al.

(10) Patent No.: US 12,003,259 B2
(45) Date of Patent: Jun. 4, 2024

(54) CUSTOM SIGNAL DATA GENERATION IN A RADIO SYSTEM

(71) Applicant: Dell Products L.P., Round Rock, TX (US)

(72) Inventors: John Bradley Deforge, Chelsea (CA); Sewvanda Don, Ottawa (CA); Tommy Ivarsson, Ottawa (CA); Mikhail Shenouda, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 109 days.

(21) Appl. No.: 17/733,639

(22) Filed: Apr. 29, 2022

(65) Prior Publication Data

US 2023/0353174 A1    Nov. 2, 2023

(51) Int. Cl.
*H04B 1/04* (2006.01)
*H04B 17/15* (2015.01)

(52) U.S. Cl.
CPC .............. *H04B 1/04* (2013.01); *H04B 17/15* (2015.01)

(58) Field of Classification Search
CPC ... H04B 1/04; H04B 1/10; H04B 1/12; H04B 1/44; H04B 7/2662; H04B 17/00; H04B 17/15; H04B 17/11; H04B 17/21; H04B 17/0085; H04L 5/00; H04L 12/28; H04W 56/00; H04W 72/04; H04W 88/02
USPC ................. 375/219, 295–297, 316
See application file for complete search history.

(56) References Cited

U.S. PATENT DOCUMENTS

| 7,362,800 | B1 * | 4/2008 | Zerbe ................ H04L 25/03038 375/232 |
| 2008/0043860 | A1 | 2/2008 | Moffatt |
| 2013/0122825 | A1 | 5/2013 | Deforge et al. |
| 2014/0362955 | A1 | 12/2014 | Muhammad |
| 2016/0197684 | A1 | 7/2016 | Tsai et al. |

(Continued)

FOREIGN PATENT DOCUMENTS

CN            114185767 A      3/2022

OTHER PUBLICATIONS

International Search Report and Written Opinion dated Apr. 24, 2023 for PCT Application No. PCT/US2022/053290, 14 pages.

(Continued)

*Primary Examiner* — Shawkat M Ali
(74) *Attorney, Agent, or Firm* — Amin, Turocy & Watson, LLP

(57) ABSTRACT

A system can comprise a memory that is configured to store and retrieve a first signal. The system can comprise a generator that is configured to generate first in-phase, quadrature sub-carrier values. The system can comprise a look up table that stores predetermined second in-phase, quadrature sub-carrier values. The system can comprise a pseudo-random look up table generator that is configured to operate on the predetermined second in-phase, quadrature sub-carrier values to produce pseudo-random data values. The system can comprise a component that is configured to inject a second signal into a radio unit, wherein the second signal is selected from the memory, the generator, the look up table, and the pseudo-random look up table generator, and wherein the second signal is configurably switched between a time domain path of a digital front end of the system, and a frequency domain path of the digital front end.

20 Claims, 19 Drawing Sheets

(56) References Cited

U.S. PATENT DOCUMENTS

| | | |
|---|---|---|
| 2017/0207884 A1 | 7/2017 | Jiang et al. |
| 2020/0343985 A1 | 10/2020 | O'Shea et al. |
| 2022/0209805 A1* | 6/2022 | Yu ..................... H04B 1/0007 |
| 2022/0271782 A1* | 8/2022 | Arditti Ilitzky ...... H04B 1/0096 |
| 2023/0344512 A1 | 10/2023 | Deforge et al. |

OTHER PUBLICATIONS

Invitation to Pay Additional Fees for PCT Application No. PCT/US2022/053281 mailed Apr. 24, 2023, 14 pages.

International Search Report and Written Opinion for PCT Application No. PCT/US2022/053281 mailed Jun. 16, 2023, 21 pages.

\* cited by examiner

600

```
┌─────────────────────────────────────────────────────────────────┐
│                                                                 │
│   ┌─────────────────────────────────────────────────────────┐   │
│   │  MEMORY THAT IS CONFIGURED TO STORE AND RETRIEVE        │   │
│   │              A FIRST SIGNAL 602                         │   │
│   └─────────────────────────────────────────────────────────┘   │
│                                                                 │
│   ┌─────────────────────────────────────────────────────────┐   │
│   │  GENERATOR THAT IS CONFIGURED TO GENERATE FIRST         │   │
│   │  IN-PHASE, QUADRATURE SUB-CARRIER VALUES 604            │   │
│   └─────────────────────────────────────────────────────────┘   │
│                                                                 │
│   ┌─────────────────────────────────────────────────────────┐   │
│   │  LOOK UP TABLE THAT STORES PREDETERMINED SECOND         │   │
│   │  IN-PHASE, QUADRATURE SUB-CARRIER VALUES 606            │   │
│   └─────────────────────────────────────────────────────────┘   │
│                                                                 │
│   ┌─────────────────────────────────────────────────────────┐   │
│   │  PSEUDO-RANDOM LOOK UP TABLE GENERATOR THAT IS          │   │
│   │  CONFIGURED TO OPERATE ON THE PREDETERMINED             │   │
│   │  SECOND IN-PHASE, QUADRATURE SUB-CARRIER VALUES         │   │
│   │  TO PRODUCE PSEUDO-RANDOM DATA VALUES 608               │   │
│   └─────────────────────────────────────────────────────────┘   │
│                                                                 │
│   ┌─────────────────────────────────────────────────────────┐   │
│   │ COMPONENT THAT IS CONFIGURED TO INJECT A SECOND SIGNAL  │   │
│   │ INTO A RADIO UNIT USED BY THE SYSTEM, WHEREIN THE       │   │
│   │ SECOND SIGNAL IS SELECTED FROM THE MEMORY, THE          │   │
│   │ GENERATOR, THE LOOK UP TABLE, AND THE PSEUDO-RANDOM     │   │
│   │ LOOK UP TABLE GENERATOR, AND WHEREIN THE SECOND         │   │
│   │ SIGNAL IS CONFIGURABLY SWITCHED BETWEEN A TIME          │   │
│   │ DOMAIN PATH OF A DIGITAL FRONT END OF THE SYSTEM,       │   │
│   │ AND A FREQUENCY DOMAIN PATH OF THE DIGITAL FRONT        │   │
│   │ END 610                                                 │   │
│   └─────────────────────────────────────────────────────────┘   │
└─────────────────────────────────────────────────────────────────┘
```

```
┌─────────────────────────────────────────────────────────────┐
│  ┌───────────────────────────────────────────────────────┐  │
│  │  MEMORY THAT IS CONFIGURED TO STORE AND RETRIEVE      │  │
│  │              A FIRST SIGNAL 702                       │  │
│  └───────────────────────────────────────────────────────┘  │
│                                                             │
│  ┌───────────────────────────────────────────────────────┐  │
│  │  GENERATOR THAT IS CONFIGURED TO GENERATE FIRST       │  │
│  │  IN-PHASE, QUADRATURE SUB-CARRIER VALUES 704          │  │
│  └───────────────────────────────────────────────────────┘  │
│                                                             │
│  ┌───────────────────────────────────────────────────────┐  │
│  │  LOOK UP TABLE THAT STORES PREDETERMINED SECOND       │  │
│  │  IN-PHASE, QUADRATURE SUB-CARRIER VALUES 706          │  │
│  └───────────────────────────────────────────────────────┘  │
│                                                             │
│  ┌───────────────────────────────────────────────────────┐  │
│  │  PSEUDO-RANDOM LOOK UP TABLE GENERATOR THAT IS        │  │
│  │  CONFIGURED TO OPERATE ON THE PREDETERMINED           │  │
│  │  SECOND IN-PHASE, QUADRATURE SUB-CARRIER VALUES       │  │
│  │  TO PRODUCE PSEUDO-RANDOM DATA VALUES 708             │  │
│  └───────────────────────────────────────────────────────┘  │
│                                                             │
│  ┌───────────────────────────────────────────────────────┐  │
│  │  COMPONENT THAT IS CONFIGURED TO INJECT A SECOND      │  │
│  │  SIGNAL INTO A RADIO UNIT USED BY THE SYSTEM,         │  │
│  │  WHEREIN THE SECOND SIGNAL IS SELECTED FROM THE       │  │
│  │  MEMORY, THE GENERATOR, THE LOOK UP TABLE, AND THE    │  │
│  │  PSEUDO-RANDOM LOOK UP TABLE GENERATOR, AND           │  │
│  │  WHEREIN THE SECOND SIGNAL IS CONFIGURABLY SWITCHED   │  │
│  │  BETWEEN A TIME DOMAIN PATH OF A DIGITAL FRONT END    │  │
│  │  OF THE SYSTEM, AND A FREQUENCY DOMAIN PATH OF THE    │  │
│  │  DIGITAL FRONT END 710                                │  │
│  └───────────────────────────────────────────────────────┘  │
│                                                             │
│  ┌───────────────────────────────────────────────────────┐  │
│  │  RESOURCE ELEMENT MASKING COMPONENT THAT IS           │  │
│  │  CONFIGURED TO MASK AT LEAST PART OF THE SECOND       │  │
│  │  SIGNAL BEFORE THE SECOND SIGNAL IS INJECTED INTO     │  │
│  │                    THE RADIO 712                      │  │
│  └───────────────────────────────────────────────────────┘  │
└─────────────────────────────────────────────────────────────┘
```

```
┌─────────────────────────────────────────────────────────────┐
│                                                             │
│   ┌─────────────────────────────────────────────────────┐   │
│   │                                                     │   │
│   │              RADIO UNIT 1202                        │   │
│   │                                                     │   │
│   └─────────────────────────────────────────────────────┘   │
│                                                             │
│   ┌─────────────────────────────────────────────────────┐   │
│   │   SIGNAL GENERATION COMPONENT CONFIGURED TO         │   │
│   │  GENERATE A FIRST SIGNAL, WHEREIN THE FIRST SIGNAL  │   │
│   │   IS SEPARATE FROM A SECOND SIGNAL THAT COMPRISES   │   │
│   │                  LIVE-AIR DATA 1204                 │   │
│   └─────────────────────────────────────────────────────┘   │
│                                                             │
│   ┌─────────────────────────────────────────────────────┐   │
│   │ INJECTION COMPONENT THAT IS CONFIGURED TO INJECT    │   │
│   │ THE FIRST SIGNAL INTO THE RADIO UNIT, WHEREIN THE   │   │
│   │ FIRST SIGNAL IS CONFIGURABLY SWITCHED BETWEEN A     │   │
│   │ TIME DOMAIN PATH OF A DIGITAL FRONT END OF THE      │   │
│   │ SYSTEM, AND A FREQUENCY DOMAIN PATH OF THE          │   │
│   │ DIGITAL FRONT END 1206                              │   │
│   └─────────────────────────────────────────────────────┘   │
│                                                             │
│   ┌─────────────────────────────────────────────────────┐   │
│   │  TIME ALIGNMENT COMPONENT THAT IS CONFIGURED TO     │   │
│   │  TRIGGER AND TIME-ALIGN THE FIRST SIGNAL PRIOR TO   │   │
│   │   BEING INSERTED INTO THE FIRST RADIO 1208          │   │
│   └─────────────────────────────────────────────────────┘   │
│                                                             │
└─────────────────────────────────────────────────────────────┘
```

SELECTING A FIRST SIGNAL FROM, A MEMORY THAT IS CONFIGURED TO STORE AND RETRIEVE A SECOND SIGNAL, A GENERATOR THAT IS CONFIGURED TO GENERATE FIRST IN-PHASE, QUADRATURE SUB-CARRIER VALUES, A LOOK UP TABLE THAT STORES PREDETERMINED SECOND IN-PHASE, QUADRATURE SUB-CARRIER VALUES, AND A PSEUDO-RANDOM LOOK UP TABLE GENERATOR THAT IS CONFIGURED TO OPERATE ON THE PREDETERMINED SECOND IN-PHASE, QUADRATURE SUB-CARRIER VALUES TO PRODUCE PSEUDO-RANDOM DATA VALUES 1304

INJECTING THE FIRST SIGNAL INTO A RADIO UNIT USED BY THE SYSTEM, WHEREIN THE SECOND SIGNAL IS CONFIGURABLY SWITCHED BETWEEN A TIME DOMAIN PATH OF A DIGITAL FRONT END OF THE SYSTEM, AND A FREQUENCY DOMAIN PATH OF THE DIGITAL FRONT END 1306

SELECTING A FIRST CUSTOM SIGNAL 1404

↓

COMBINING DATA REPRESENTING THE FIRST CUSTOM SIGNAL WITH LIVE-AIR SIGNAL DATA REPRESENTING A LIVE-AIR SIGNAL USED BY RADIO 1406

READING A THIRD SIGNAL FROM THE RADIO UNIT, WHEREIN THE THIRD SIGNAL IS GENERATED BASED ON THE FIRST SIGNAL 1504

DETERMINING A PERFORMANCE METRIC OF THE RADIO UNIT BASED ON A COMPARISON OF THE FIRST SIGNAL AND THE THIRD SIGNAL 1506

CUSTOM SIGNAL DATA GENERATION IN A RADIO SYSTEM

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a memory that is configured to store and retrieve a first signal. The system can further comprise a generator that is configured to generate first in-phase, quadrature sub-carrier values. The system can further comprise a look up table that stores predetermined second in-phase, quadrature sub-carrier values. The system can further comprise a pseudo-random look up table generator that is configured to operate on the predetermined second in-phase, quadrature sub-carrier values to produce pseudo-random data values. The system can further comprise a component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end.

An example method can comprise selecting, by a system comprising a processor, a first signal from a memory that is configured to store and retrieve a second signal, a generator that is configured to generate first in-phase, quadrature sub-carrier values, a look up table that stores predetermined second in-phase, quadrature sub-carrier values, and a pseudo-random look up table generator that is configured to operate on the predetermined second in-phase, quadrature sub-carrier values to produce pseudo-random data values. The method can further comprise injecting, by the system, the first signal into a radio unit used by the system, wherein the second signal is configurably switched between a time domain path of a digital front end of the system, and a frequency domain path of the digital front end.

An example apparatus can comprise a radio unit. The apparatus can further comprise a signal generation component configured to generate a first signal, wherein the first signal is separate from a second signal that comprises live-air data. The apparatus can further comprise an injection component that is configured to inject the first signal into the radio unit, wherein the first signal is configurably switched between a time domain path of a digital front end of the system, and a frequency domain path of the digital front end.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates another example system architecture that can facilitate custom signal data generation in a radio system, in accordance with an embodiment of this disclosure;

FIG. 7 illustrates another example system architecture that can facilitate custom signal data generation in a radio system, in accordance with an embodiment of this disclosure;

FIG. 12 illustrates another example system architecture that can facilitate custom signal data generation in a radio system, in accordance with an embodiment of this disclosure;

FIG. 13 illustrates an example process flow that can facilitate custom signal data generation in a radio system, in accordance with an embodiment of this disclosure;

FIG. 14 illustrates another example process flow that can facilitate custom signal data generation in a radio system, in accordance with an embodiment of this disclosure;

FIG. 15 illustrates another example process flow that can facilitate custom signal data generation in a radio system, in accordance with an embodiment of this disclosure;

DETAILED DESCRIPTION

Overview

Figure 1:
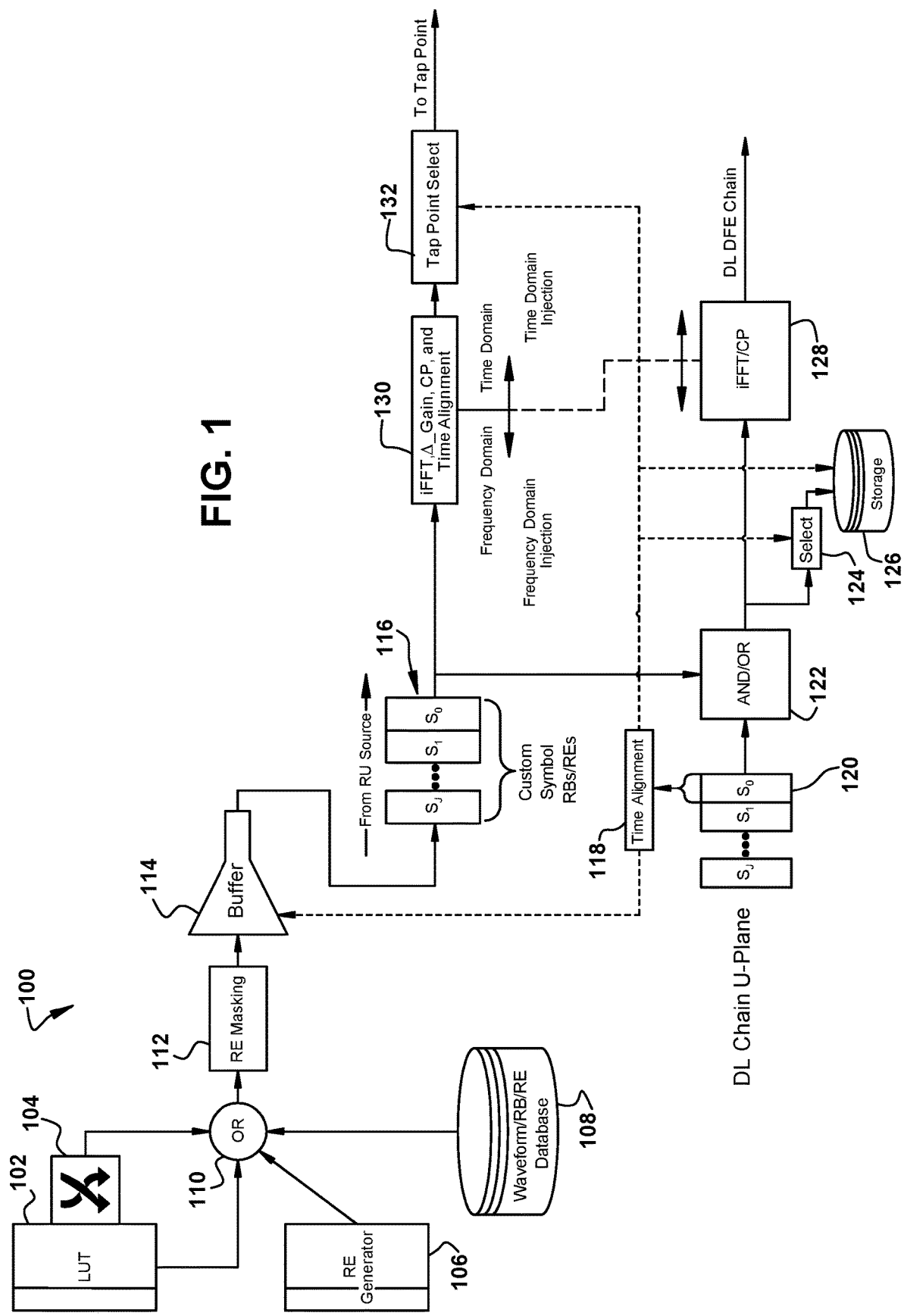
FIG. 1 illustrates an example system architecture that can facilitate custom signal data generation in a radio system, in accordance with an embodiment of this disclosure.

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

An ability to generate customized signal data and inject into a radio's signal chain can be tantamount to an ability to further capture and derive key performance data from radio sub-systems. According to the present techniques, and analogous to custom waveforms from a signal generator, a custom signal can be injected or added to live-air signals to become a custom hybrid of live-air signal data. Custom signals, or signals independent of live-air signals (that is, non-live-air signals) can also be generated. Custom signal data can, in many instances, be statistically equivalent to live-air data. In some examples according to the present techniques, live-air data can be used as if it were custom data.

An ability to read, record and recall data for further analysis can facilitate a deeper understanding of system performance (among other things), and can be further used to determine improved performance aspects of system operation, maintenance, and customer experience (among other things).

The present techniques can be implemented for creation and injection of custom waveforms into a u-plane of a system. In prior approaches, it can be that an ability to inject signals is not part of a normal signal data path. In an example, this signal injection can occur at a distributed unit of a radio. In another example, this signal injection can occur at a radio unit of a radio.

Custom data according to the present techniques can be originated in several ways, including the following. A memory that is onboard to the radio can be configured to temporally play a suitable waveform or noise-like signal. A dynamic resource block/resource element RB/RE allocation can be configured to generate between 1 and 4,096 (or other) inphase and quadrature (I+Q) 16 bit (signed) data pairs of arbitrary sub-carrier values for a given desired modulation coding scheme (MCS). Such a dynamic RB/RE allocation can be operated as a Moore machine or a Mealy machine.

A look up table can be configured to store predetermined I/Q data values, which are each able to represent a component of a constellation of a given MCS level. Look up table data can be played in order, or randomized to be playable in any order. In some examples, a look up table can fulfill a given constellation/MCS symbol map and a predetermined complementary cumulative distribution function (CCDF). A signal from a look up table can be a one-tone signal or a multi-tone signal.

A pseudo-random look up table generator can operate in conjunction with a look up table. A pseudo-random look up table generator can comprise a block that operates on the look up table's I/Q data and produces a pseudo random symbol of data values of suitable random distribution. Values can be selected from the look up table in a random fashion to fulfill a symbol (e.g., a complete RB matrix) of signal data).

In examples according to the present techniques, custom signals can be injected into a radio unit, a distributed unit, or both a radio unit and a distributed unit, in a frequency domain of the radio. In some examples, custom signals can be injected into each of a radio unit and a distributed unit in a frequency domain, as well as be injected into the radio unit in a time domain.

A custom signal can be mapped to a specific location in a RB matrix, such as by deterministic means or by use of a mask. Custom signal data can be provided on a single discrete period basis on a smallest system time interval of a radio. In some examples, a time boundary can be 1 symbol period. Custom signal data can be synchronized with typical system time boundaries.

The present techniques can be implemented to provide synchronization information to a capture mechanism to facilitate proper integration over discrete system time boundaries.

In some examples, data can be added to live-air data to create a hybrid of mission and custom data. In some examples, data can be custom-only data (that is, non-live-air). In some examples, data can be live-air data.

Regarding dimensioning, 1 I+Q bit can be equivalent to 1 resource element/sub-carrier in a frequency domain. In an example, there can be up to 4,096 resource elements of I+Q, up to 16 bits (signed data pairs). In an example, data generated for a radio unit can support masking so that all, or a subset, of the 0 to 4,095 resource elements available can either be passed to, or removed from, a data stream the AND/OR block. In some examples, a mask can be enabled or disabled, where a disabled mask is a pass-through state.

MCSes can be available as supported by radio requirements. Data can be triggered and time aligned with system timing on a symbol by symbol basis. In some examples, data can be triggered and time aligned based on other relevant system time boundaries.

In some examples, data AND/OR blocks can be implemented for selecting a source of data. A distributed unit can provision one resource, or a plurality of resources, of signal data available to radio unit sourced signal data for injection of custom data. Data can be sourced purely from a distributed unit live-air u-plane path source (that is, the data can be live-air data). Data can be sourced purely from sources internal to a radio unit, and injected into the u-plane data path (that is, the data can be non-live-air data). These sources can include a memory, a dynamic RB/RE generator, a look up table, and a pseudo-random look up table, with or without a mask enabled. Data can be sourced from a combination of both sources for a distributed unit and radio unit u-plane (That is, the data can be a hybrid of live-air data and non-live-air data).

In some prior approaches, an engineering team might conclude that implementing the present techniques would be too costly to add to a production level product. However, in fact, implementing the present techniques can create a cost savings in production.

Using a signal generation block/digital front end topology can be a component of a scenario that can reduce or eliminate the use of traditional factory test instruments and test bed. This can lead to a cost of manufacturing savings that exceeds a cost of implementing the present techniques.

It can be that testing analog circuitry and a digital block to which the analog circuitry interfaces requires a predictable, fixed, or somewhat known environment to yield repeatable and deterministic results. A radio that possesses wholly-internal signal generation, based in digital, passed (or transmitted) to analog, and further looped back to digital paths (internal to the radio, and without a need for external instruments, fixtures, or modification thereof) can produce repeatable results.

Additionally, measured results according to the present techniques, following a transformation through a radio unit, can be more repeatable, and this signal generation for test/self-test functionality can travel with the radio to the field. This can be due to a wholly-internal nature of signal generation and a subsequent ability to capture after passing through a transfer function that is the radio's sub blocks.

An ability to intricately design a waveform and inject it into the signal path can be used to derive specific performance measurement parameters, which can facilitate real-time modifications to operational parameters.

Using the present techniques, injecting custom signals into unused resource blocks (for example), can facilitate making highly precise and discrete assessments of performance on the fly during live-air periods. An ability, in the frequency domain, shift injected signals in frequency on a symbol-by-symbol basis can be used to assess performance of a radio unit's operational frequency bands.

Signal injection at a radio system level (beyond a radio unit) can provide an ability to take this feature that can be targeted to a radio unit, and deploy this system performance/measurement capability on a distributed unit for use with a wide array of corresponding radio units.

Digital circuitry can be deterministic, where an output is a combination of an input and a transfer function. Radiofrequency or analog circuitry can change with environmental conditions. However, where the stimulus is unchanging, and the capture technique is unchanging, then it can be that the only variable is the circuitry under test. Environmental changes can be predictable and/or characterizable for a given circuit—and thereby predictable to a reasonable degree. For a given input, and re-using a same capture apparatus, a functional circuit can be deterministic to a reasonable degree given normal operating conditions and operational state.

It can be that calibration is performed at any time—that is, it can be that the relative data collected on a radio does not change over time providing that a fault condition has not developed—and if a fault condition does develop, relative comparative tests can show a performance change. Additionally, relative tests can show results of aging through a radio's lifetime.

It can be a problem to build a radio that meets these specifications and requirements of a target employment, and is able to inject a signal and test. The present techniques can overcome this problem by providing for a device under test (DUT) that is its own test set, and is capable of performing tests internally.

Deviations from normal operations can relate to knowable or determinable mechanisms: software (SW), firmware (FW), hardware (HW), or operational-state error, or a change in operations due to an external influence like a failure or fault in the operational circuit. Knowable or determinable causality can be derived from tests evaluated by/from a perspective of a design engineer or artificial intelligence (AI)/machine learning (ML) agent, whereby a fault or failure can be characterizable and knowable where a sufficient suite of tests is performed, and results are analyzed.

Where a digital twin is extended to a cloud-based platform, real-time and historical data over a lifespan of a population of radios in the field can be assessed. A refinement of a characterization can become increasingly deterministic over time.

In sum, a complexity of adding signal injection to an analog loopback circuit can unlock a repeatable, reproducible, and/or field-testable radio that is capable of producing laboratory-level complexity test results that can be repeatable throughout a lifetime of a fielded radio unit, that are deterministic. By association, a suite of tests, commands, and/or stimuli can also be refined to become deterministic.

Example Architectures

FIG. 1 illustrates an example system architecture 100 that can facilitate custom signal data generation in a radio system, in accordance with an embodiment of this disclosure. System architecture 100 can generally comprise a system architecture for custom signal injection into a radio unit of a radio system.

System architecture 100 comprises look up table 102; pseudo-random look up table generator 104; generator 106; memory 108; OR 110 (in some embodiments this can be an AND gate and/or an OR gate); masking 112; buffer 114; custom symbol resource blocks/resource elements (RBs/REs) 116; time alignment 118; custom symbol RBs/REs 120; AND/OR 122; select 124; storage 126; inverse Fast Fourier Transform (iFFT)/cyclic prefix (CP) 128; inverse Fast Fourier Transform (iFFT) 130 (which can also perform A gain, cyclic prefix insertion, and time alignment); and tap point select 132.

In some examples, look up table 102 can store predetermined second in-phase, quadrature sub-carrier values represent respective components of a constellation of a respective modulation coding scheme level. In some examples, pseudo random look up table generator 104 is configured to select values from the look up table randomly to generate a resource block matrix symbol of signal data.

In some examples, generator 106 is configured to generate signed data pairs of arbitrary sub carrier values for a selected multi carrier system.

Generally, look up table 102; pseudo-random look up table generator 104; generator 106; and memory 108 can provide different types of signal creation. OR 110 can facilitate combining these different signals (or using one signal). Masking 112 can facilitate tailoring a signal in an efficient time fashion. Buffer 114 can facilitate holding the custom signal data back until a precise time at which is to be injected (such as at AND/OR 122). Time alignment 118 can provide precise time gating and triggering for buffer 114 to ensure that the signal is available at the correct time, and only for that time.

In some examples, a custom signal can be generated with a combination of look up table 102; pseudo-random look up table generator 104; generator 106; memory 108; and/or OR 110. This signal can be passed to masking 112 where it is selectively masked. The masked signal can be passed to buffer 114 where it is buffered. Time alignment 118 can time align the buffered signal at 114 so that the custom signal is injected at a time boundary of the radio system.

Then, where a radio system comprises multiple tap points to choose from for injecting the custom signal, tap point select 132 can select a particular tap point of the radio system and the custom signal can be injected at that tap point.

Figure 2:
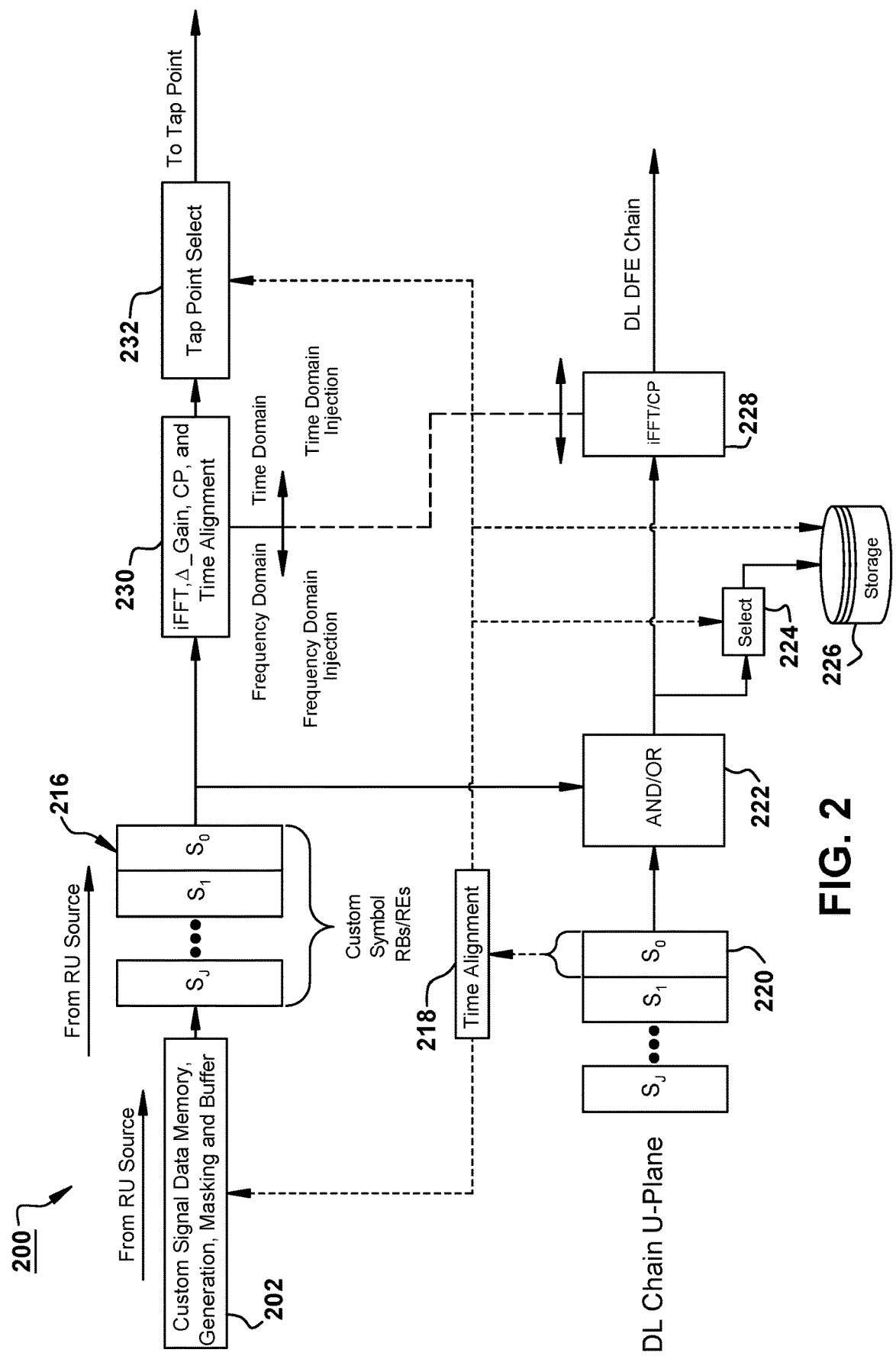
FIG. 2 illustrates another example system architecture that can facilitate custom signal data generation in a radio system, in accordance with an embodiment of this disclosure.

FIG. 2 illustrates another example system architecture 200 that can facilitate custom signal data generation in a radio system, in accordance with an embodiment of this disclosure. System architecture 200 can generally comprise a system architecture for custom signal injection into a radio unit of a radio system. In some examples, system architecture 200 can represent a logically simplified version of system architecture 100 of FIG. 1.

System architecture 200 comprises custom signal data memory, generation, masking, and buffer 202; custom symbol resource blocks/resource elements (RBs/REs) 216; time alignment 218; custom symbol RBs/REs 220; AND/OR 222; select 224; storage 226; inverse Fast Fourier Transform (iFFT)/cyclic prefix (CP) 228; inverse Fast Fourier Transform (iFFT) 230 (which can also perform A gain, cyclic prefix insertion, and time alignment); and tap point select 232.

In some examples, custom signal data memory, generation, masking, and buffer 202 can be similar to a combination of look up table 102; pseudo-random look up table generator 104; generator 106; memory 108; OR 110 (in some embodiments this can be an AND gate and/or an OR gate); masking 112; and buffer 114 of FIG. 1.

In some examples, custom symbol resource blocks/resource elements (RBs/REs) 216; time alignment 218; custom symbol RBs/REs 220; AND/OR 222; select 224; storage 226; inverse Fast Fourier Transform (iFFT)/cyclic prefix (CP) 228; inverse Fast Fourier Transform (iFFT) 230 (which can also perform A gain, cyclic prefix insertion, and time alignment); and tap point select 232 can be similar to custom symbol resource blocks/resource elements (RBs/REs) 116; time alignment 118; custom symbol RBs/REs 120; AND/OR 122; select 124; storage 126; inverse Fast Fourier Transform (iFFT)/cyclic prefix (CP) 128; inverse Fast Fourier Transform (iFFT) 130 (which can also perform A gain, cyclic prefix insertion, and time alignment); and tap point select 132 of FIG. 1, respectively.

In some examples, custom signal data memory, generation, masking, and buffer 202. Custom signal data memory, generation, masking, and buffer 202 can also mask, buffer, and time align this signal (in conjunction with time alignment 218).

Then, where a radio system comprises multiple tap points to choose from for injecting the custom signal, tap point select 232 can select a particular tap point of the radio system and the custom signal can be injected at that tap point.

Figure 3:
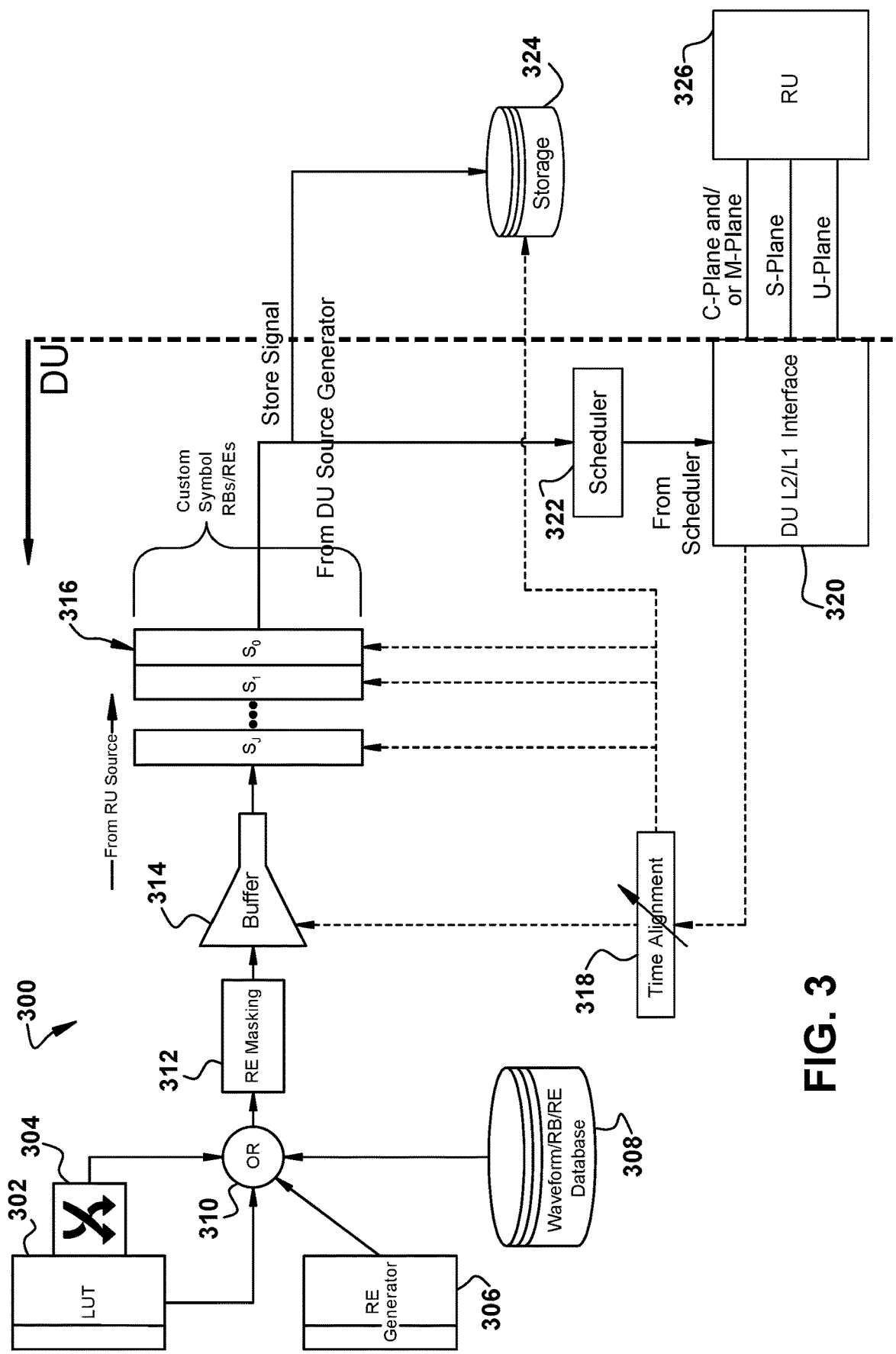
FIG. 3 illustrates another example system architecture that can facilitate custom signal data generation in a radio system, in accordance with an embodiment of this disclosure.

FIG. 3 illustrates another example system architecture 300 that can facilitate custom signal data generation in a radio system, in accordance with an embodiment of this disclosure. System architecture 300 can generally comprise a system architecture for custom signal injection into a distributed unit of a radio system.

System architecture 300 comprises look up table 302; pseudo-random look up table generator 304; generator 306; memory 308; OR 310 (in some embodiments this can be an AND gate and/or an OR gate); masking 312; buffer 314; custom symbol resource blocks/resource elements (RBs/REs) 316; time alignment 318; distributed unit (DU) L2/L1 interface 320; scheduler 322; storage 324; and radio unit (RU) 326.

In some examples, look up table 302; pseudo-random look up table generator 304; generator 306; memory 308; OR 310 (in some embodiments this can be an AND gate and/or an OR gate); masking 312; buffer 314; custom symbol resource blocks/resource elements (RBs/REs) 316; and time alignment 318 can be similar to look up table 102; pseudo-random look up table generator 104; generator 106; memory 108; OR 110 (in some embodiments this can be an AND gate and/or an OR gate); masking 112; buffer 114; custom symbol resource blocks/resource elements (RBs/REs) 116; time alignment 118, respectively, of FIG. 1.

In some examples, a custom signal can be generated with a combination of look up table 302; pseudo-random look up table generator 304; generator 306; memory 308; and/or OR 310. This signal can be passed to masking 312 where it is selectively masked. The masked signal can be passed to buffer 314 where it is buffered. Time alignment 318 can time align the buffered signal at 314 so that the custom signal can be injected at a time boundary of the radio system into scheduler 322 (or stored in storage 324).

Figure 4:
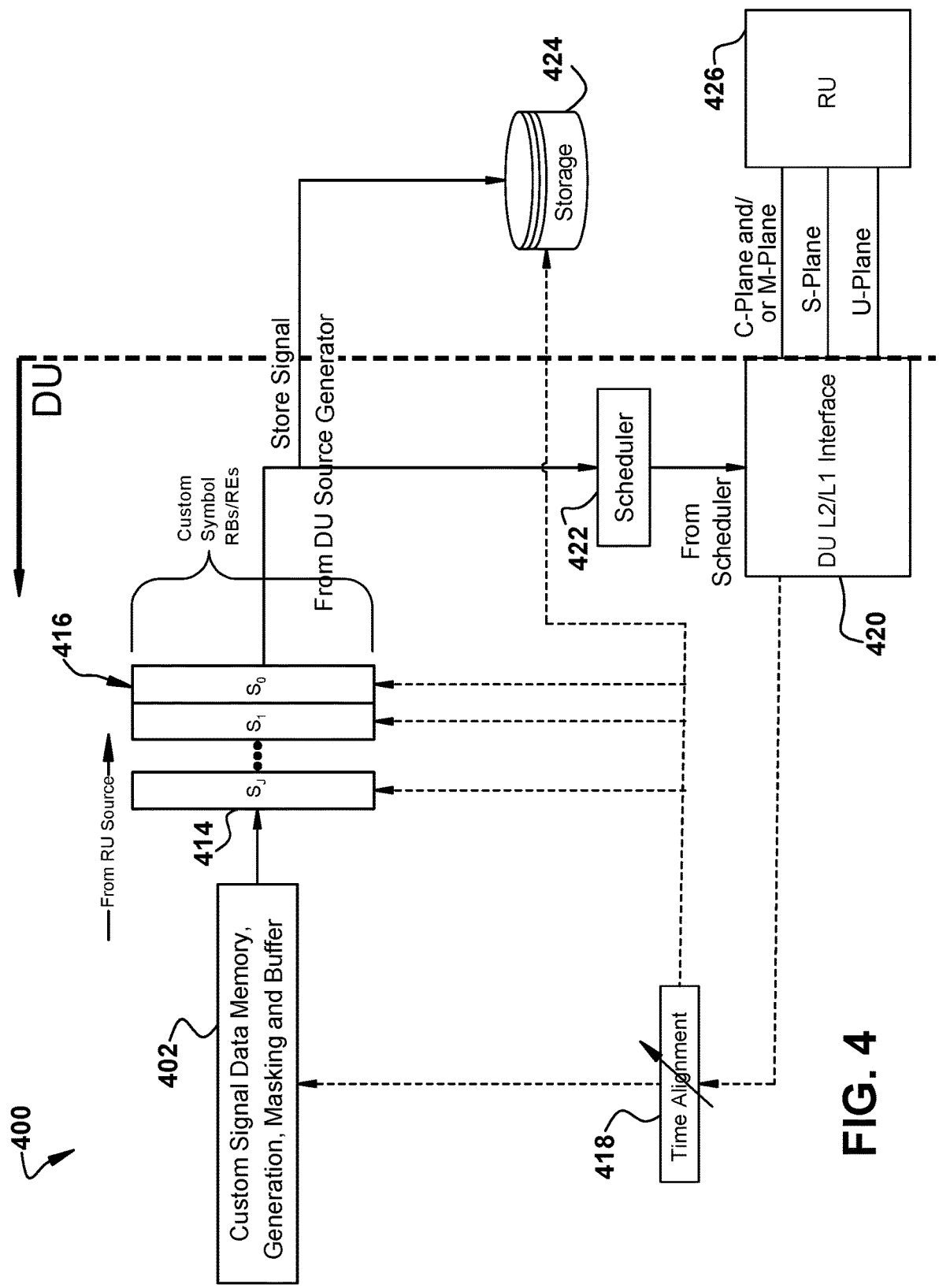
FIG. 4 illustrates another example system architecture that can facilitate custom signal data generation in a radio system, in accordance with an embodiment of this disclosure.
Figure 5A:
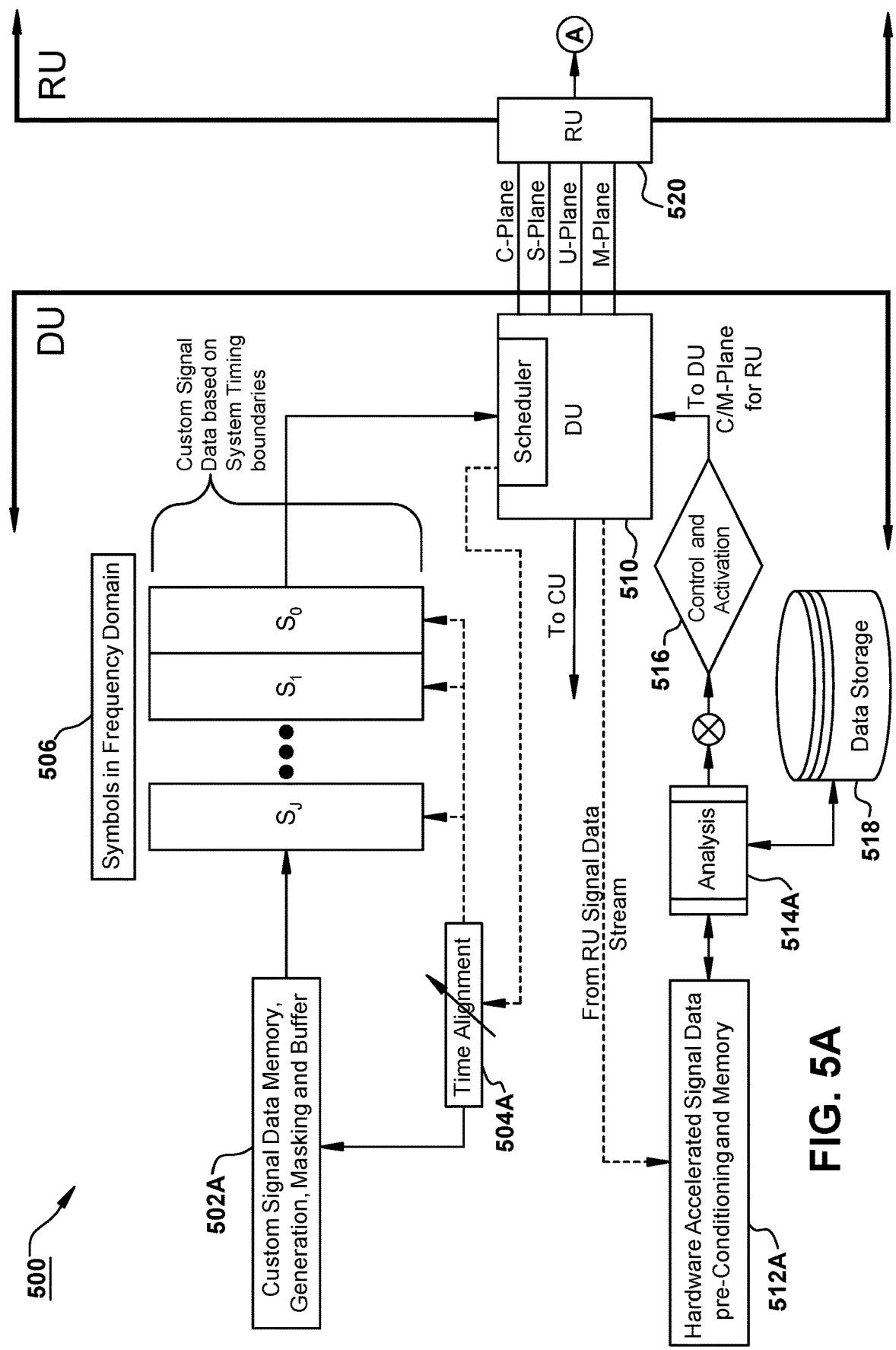
FIG. 5A, FIG. 5B, FIG. 5C, and FIG. 5D illustrate an example system architecture of a distributed unit and a radio unit of a radio system, and that can facilitate custom signal data generation in a radio system, in accordance with an embodiment of this disclosure.
Figure 5B:
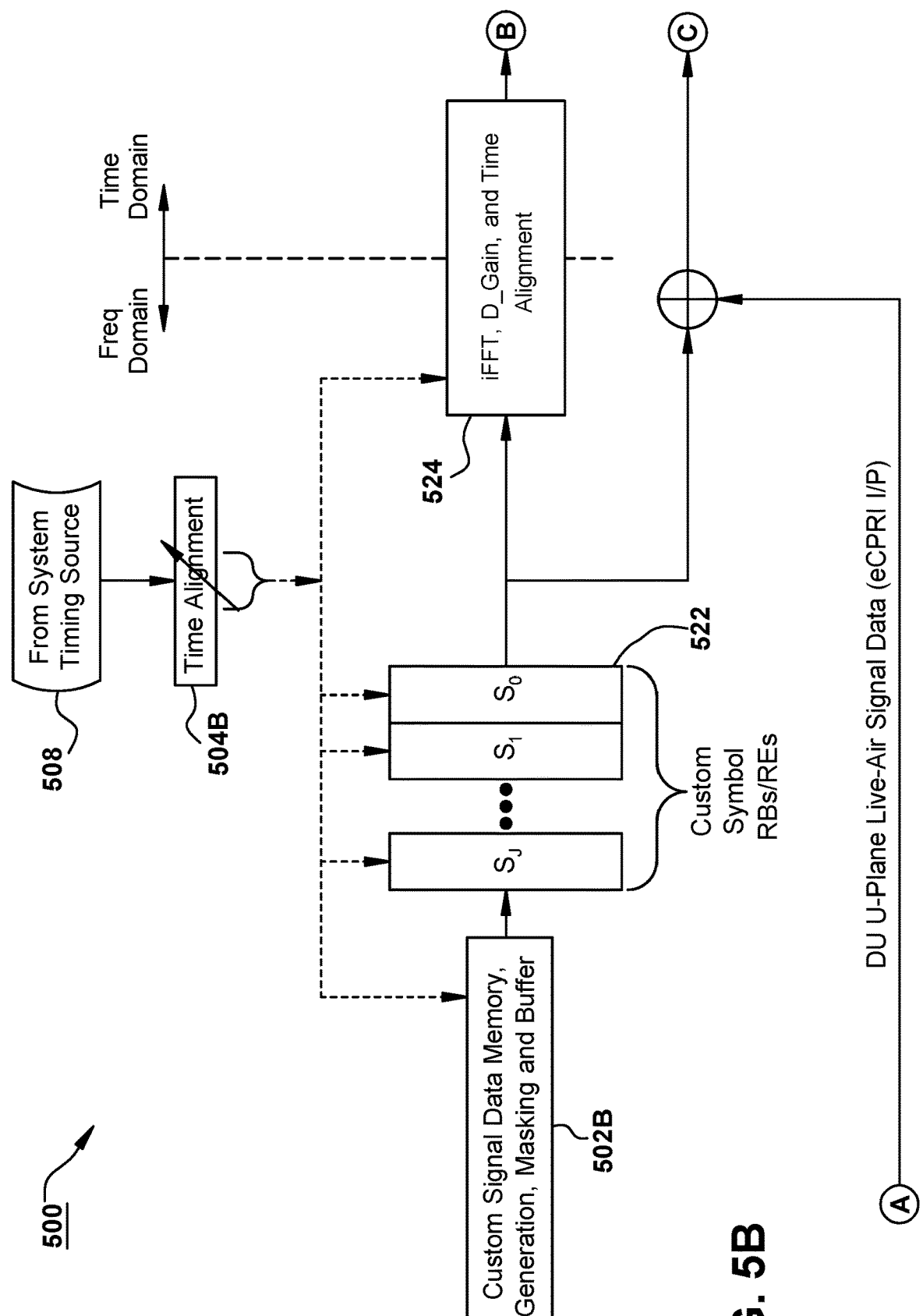
Figure 5C:
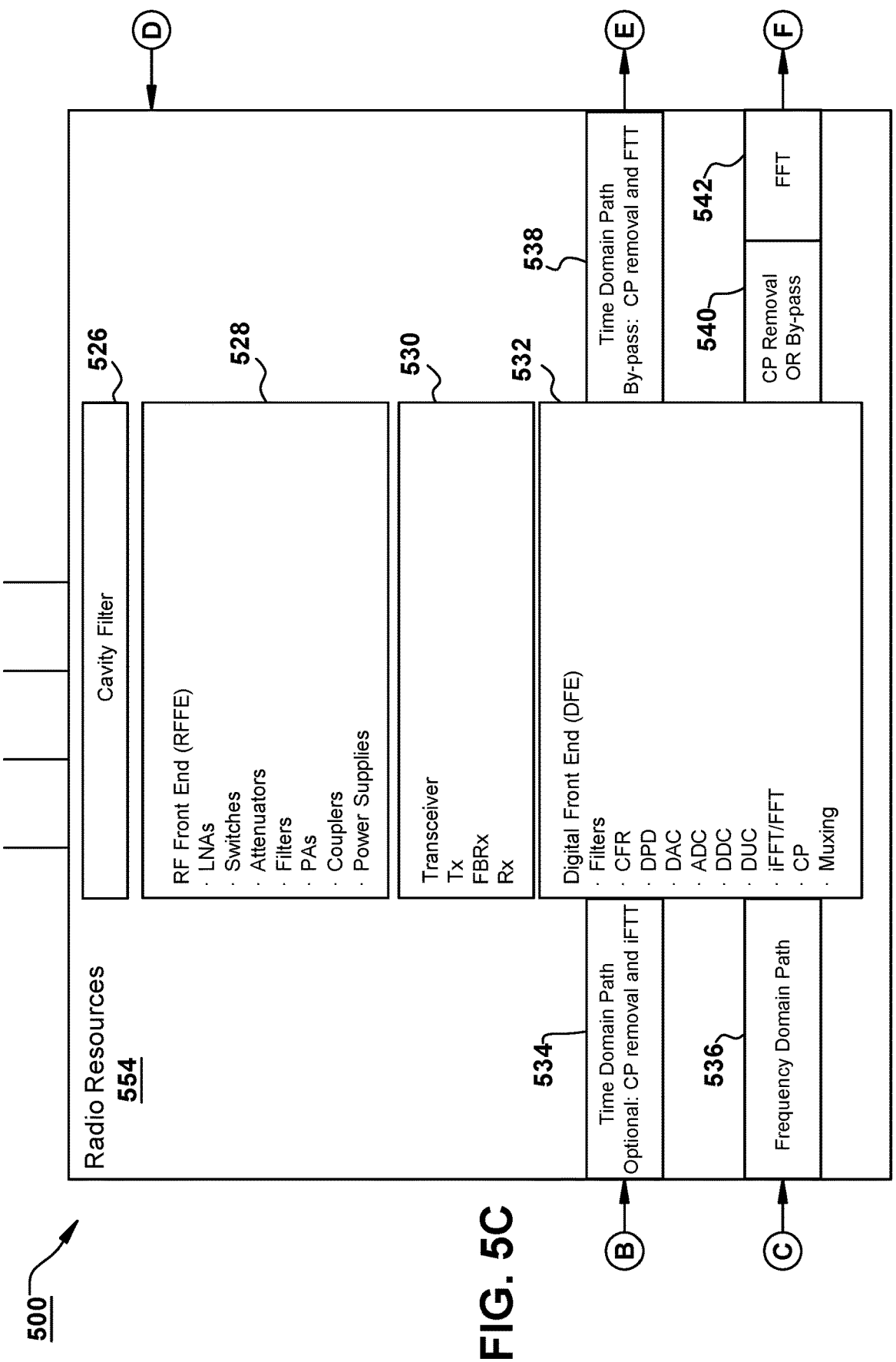
Figure 5D:
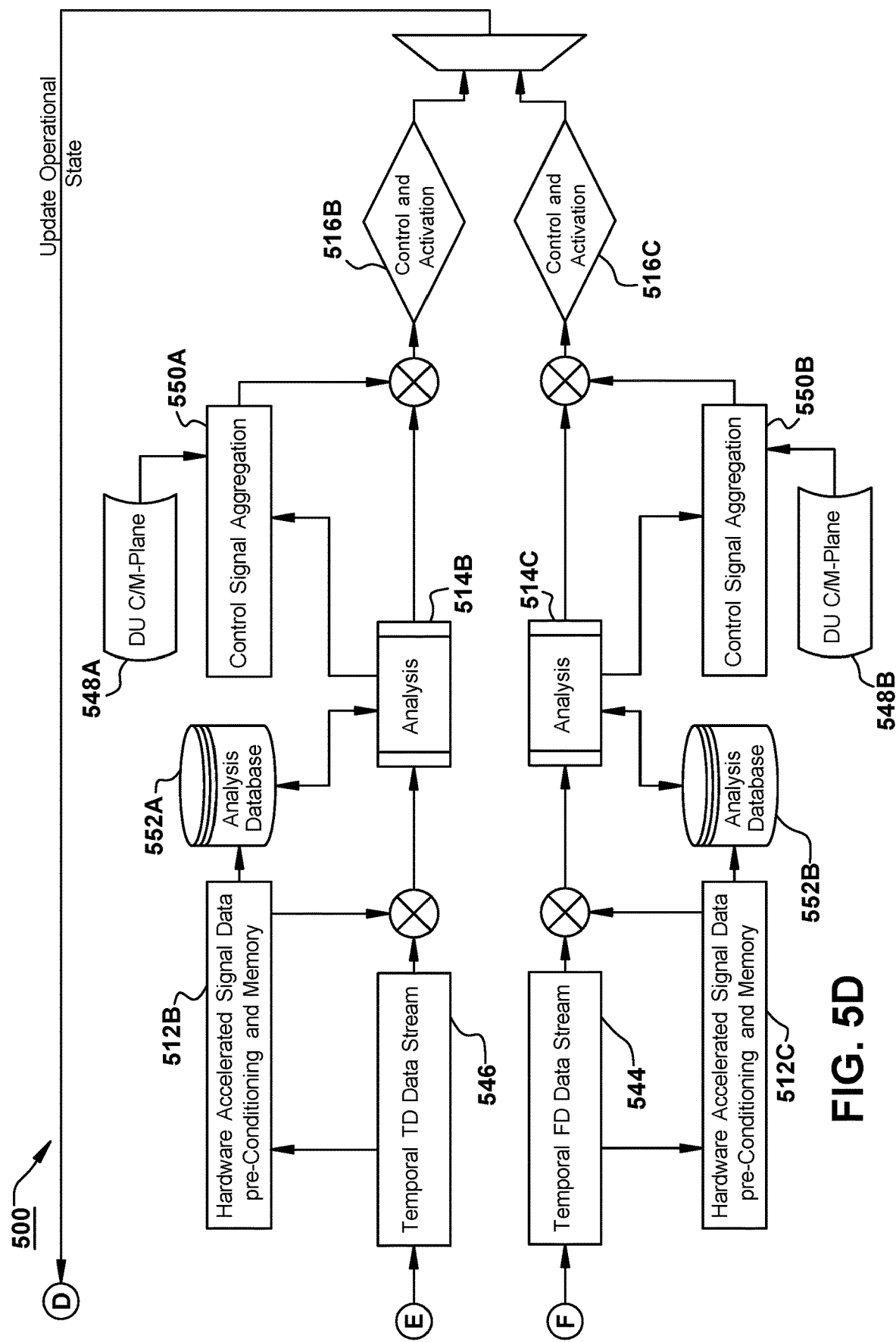

FIG. 4 illustrates another example system architecture 400 that can facilitate custom signal data generation in a radio system, in accordance with an embodiment of this disclosure. System architecture 400 can generally comprise a system architecture for custom signal injection into a radio unit of a radio system. In some examples, system architecture 400 can represent a logically simplified version of system architecture 300 of FIG. 3.

System architecture 400 comprises custom signal data memory, generation, masking, and buffer 402; custom symbol resource block/resource element (RB/RE) 414; custom symbol resource blocks/resource elements (RBs/REs) 416; time alignment 418; distributed unit (DU) L2/L1 interface 420; scheduler 422; storage 424; and radio unit (RU) 426.

In some examples, custom signal data memory, generation, masking, and buffer 402 can be similar to a combination of look up table 302; pseudo-random look up table generator 304; generator 306; memory 308; OR 310 (in some embodiments this can be an AND gate and/or an OR gate); masking 312; and buffer 314 of FIG. 3.

In some examples, custom symbol resource blocks/resource elements (RBs/REs) 416; time alignment 418; distributed unit (DU) L2/L1 interface 420; scheduler 422; storage 424; and radio unit (RU) 426 can be similar to custom symbol resource blocks/resource elements (RBs/REs) 316; time alignment 318; distributed unit (DU) L2/L1 interface 320; scheduler 322; storage 324; and radio unit (RU) 326 of FIG. 3, respectively.

In some examples, custom signal data memory, generation, masking, and buffer 402. Custom signal data memory, generation, masking, and buffer 402 can also mask, buffer, and time align this signal (in conjunction with time alignment 418).

Then, the custom signal can be injected at a time boundary of the radio system into scheduler 422 (or stored in storage 424).

FIG. 5A, FIG. 5B, FIG. 5C, and FIG. 5D illustrate an example system architecture 500 of a distributed unit and a radio unit of a radio system, and that can facilitate custom signal data generation in a radio system, in accordance with an embodiment of this disclosure. In some examples, system architecture can comprise a radio system that can comprise part(s) of system architecture 100 of FIG. 1, system architecture 200 of FIG. 2, system architecture 300 of FIG. 3, and/or system architecture 400 of FIG. 4.

As depicted, system architecture 500 comprises custom signal data memory, generation, masking, and buffer 502A and custom signal data memory, generation, masking, and buffer 502B; time alignment 504A and time alignment 504B; custom symbol RBs/REs 506; from timing system source 508; distributed unit 510; hardware accelerated signal data, pre-conditioning and memory 512A, hardware accelerated signal data, pre-conditioning and memory 512B, and hardware accelerated signal data, pre-conditioning and memory 512C; analysis 514A, analysis 514B, and analysis 514C; control and activation 516A, control and activation 516B, and control and activation 516C; data storage 518; RU 520; custom symbol RBs/REs 522; inverse Fast Fourier Transform (iFFT) 524 (which can also perform A gain, cyclic prefix insertion, and time alignment); cavity filter 526; radiofrequency (RF) front end (RFFE) 528 (which can include low noise amplifiers (LNAs), switches, attenuators, filters, PAs, couplers, and power supplies); transceiver 530 (which can include Tx, FBRx, and Rx); digital front end 532

(which can include filters, CFR, DPD, a digital to analog converter (DACs), an analog to digital converter (ADC), a digital down converters (DDC), a digital up converter (DUC), and iFFT/FFT, CP, and muxing); time domain path 534 (which can bypass CP injection and iFFT); frequency domain path 536; time domain path 538 (which can bypass CP removal and FFT); CP removal or bypass 540; FFT 542; temporal frequency domain (FD) data stream 544; temporal time domain (TD) data stream 546; DU C/M-plane 548A and DU C/M-plane 548B; control system aggregation 550A and control system aggregation 550B; analysis database 552A and analysis database 552B; and radio resources 554.

Hardware accelerated signal data pre-conditioning and memory 512A, and hardware accelerated signal data pre-conditioning and memory 512C can perform frequency domain signal data detection.

Hardware accelerated signal data pre-conditioning and memory 512B can perform time domain signal data detection.

Custom signal data memory, generation, masking, and buffer 502A and custom signal data memory, generation, masking, and buffer 502B can perform signal generation at a distributed unit or a radio unit, respectively. They can perform local synchronized custom and live-air data stimulus with known characteristics. In some examples, they can operate in a frequency domain.

Analysis 514A, analysis 514B, and analysis 514C can perform signal capture data analysis. In some examples, they can implement artificial intelligence/machine learning (AI/ML) with training (such as live and stored real-time data, and statistical data). They can provide an output of a response to actuators to change operational parameters of a radio system.

Control and activation 516A, control and activation 516B, and control and activation 516C can take inputs that augment information available to an AI/ML component and output an affect to actuators of the radio system to change operational parameters.

In some examples, respective outputs of control and activation 516B and control and activation 516C can be aggregated to affect change on a radio and radio performance.

In system architecture 500, custom signals can be generated and then injected into tap points in either a DU or an RU. Regarding the DU, the custom signals can be originated from custom signal data memory, generation, masking, and buffer 502A (which can be similar to a combination of look up table 102, pseudo-random look up table generator 104, generator 106, memory 108, OR 110, masking 112, buffer 114, and time alignment 118 of FIG. 1; and/or custom signal data memory, generation, masking, and buffer 202 of FIG. 2, in conjunction with time alignment 504A). Regarding the RU, the custom signals can be originated from custom signal data memory, generation, masking, and buffer 502B (which can be similar to a combination of look up table 102, pseudo-random look up table generator 104, generator 106, memory 108, OR 110, masking 112, buffer 114, and time alignment 118 of FIG. 3, and/or custom signal data memory, generation, masking, and buffer 404 of FIG. 4, in conjunction with time alignment 504B).

FIG. 6 illustrates another example system architecture 600 that can facilitate custom signal data generation in a radio system, in accordance with an embodiment of this disclosure. In some examples, part(s) of system architecture 600 can be used to implement part(s) of system architecture 100 of FIG. 1, system architecture 200 of FIG. 2, system architecture 300 of FIG. 3, system architecture 400 of FIG. 4, and/or system architecture 500.

System architecture 600 comprises memory that is configured to store and retrieve a first signal 602; generator that is configured to generate first in-phase, quadrature sub-carrier values 604; look up table that stores predetermined second in-phase, quadrature sub-carrier values 606; pseudo-random look up table generator that is configured to operate on the predetermined second in-phase, quadrature sub-carrier values to produce pseudo-random data values 608; and component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 610.

In some examples, memory that is configured to store and retrieve a first signal 602 can be similar to memory 108 of FIG. 1, and/or memory 308 of FIG. 3. In some examples, generator that is configured to generate first in-phase, quadrature sub-carrier values 604 can be similar to generator 106 of FIG. 1, and/or generator 306 of FIG. 3. In some examples, look up table that stores predetermined second in-phase, quadrature sub-carrier values 606 can be similar to look up table 102 of FIG. 1, and/or look up table 302 of FIG. 3.

In some examples, pseudo-random look up table generator that is configured to operate on the predetermined second in-phase, quadrature sub-carrier values to produce pseudo-random data values 608 can be similar to pseudo-random look up table generator 104 of FIG. 1, and/or pseudo-random look up table generator 304 of FIG. 3. In some examples, pseudo-random look up table generator 608 can produce a pseudo-random symbol of data values for injection into a frequency domain of a radio unit. In some examples, pseudo-random look up table generator 608 can produce a pseudo-random sample of data values for injection into a time domain of a radio unit In some examples, component that is configured to time align, buffer, and inject a second signal into a radio used by the system, wherein the second signal is selected from the memory, the generator, the look up table, and the pseudo-random look up table generator 608 can be similar to a combination of masking 112, buffer 114, time alignment 118, and or tap point select 132 of FIG. 1.

In some examples, the component is configured to inject the second signal into a time domain path of the radio unit. That is, using the example of system architecture 100 of FIG. 1, the second signal can be injected into a portion of the radio unit after inverse Fast Fourier Transform (iFFT) 130 in the signal chain—for example, between inverse Fast Fourier Transform (iFFT) 130 and tap point select 132.

In other examples, signal data can be generated as time domain data and injected straight into a time domain portion of a digital front end chain of a radio unit. In this case, an iFFT/CP block (which can be similar to iFFT/CP 128 of FIG. 1) can by optional or running in a bypass mode.

In other examples, generated data can be generated in a time domain, such as played from a memory (which can be similar to memory 108 of FIG. 1) into a digital front end, and an iFFT/CP block (which can be similar to iFFT/CP 128) could be a point at which time domain data is injected.

In some examples, the component is configured to inject the second signal into a frequency domain path of the radio unit. That is, using the example of system architecture 100 of FIG. 1, the second signal can be injected into a portion of the radio unit before inverse Fast Fourier Transform (iFFT) 130 in the signal chain.

FIG. 7 illustrates another example system architecture 700 that can facilitate custom signal data generation in a radio system, in accordance with an embodiment of this disclosure. In some examples, part(s) of system architecture 700 can be used to implement part(s) of system architecture 100 of FIG. 1, system architecture 200 of FIG. 2, system architecture 300 of FIG. 3, system architecture 400 of FIG. 4, and/or system architecture 500.

System architecture 700 comprises memory that is configured to store and retrieve a first signal 702 (which can be similar to memory that is configured to store and retrieve a first signal 602 of FIG. 6); generator that is configured to generate first in-phase, quadrature sub-carrier values 704 (which can be similar to generator that is configured to generate first in-phase, quadrature sub-carrier values 604 of FIG. 6); look up table that stores predetermined second in-phase, quadrature sub-carrier values 706 (which can be similar to look up table that stores predetermined second in-phase, quadrature sub-carrier values 606 of FIG. 6); pseudo-random look up table generator that is configured to operate on the predetermined second in-phase, quadrature sub-carrier values to produce pseudo-random data values 708 (which can be similar to pseudo-random look up table generator that is configured to operate on the predetermined second in-phase, quadrature sub-carrier values to produce pseudo-random data values 608 of FIG. 6); component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 710 (which can be similar to component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 610 of FIG. 6); and resource element masking component that is configured to mask at least part of the second signal before the second signal is injected into the radio 712.

In some examples, resource element masking component that is configured to mask at least part of the second signal before the second signal is injected into the radio 712 can be similar to resource element masking 112 of FIG. 1, and/or a portion of custom signal data memory, generation, masking, and buffer 202 of FIG. 2 that handles masking.

Figure 8:
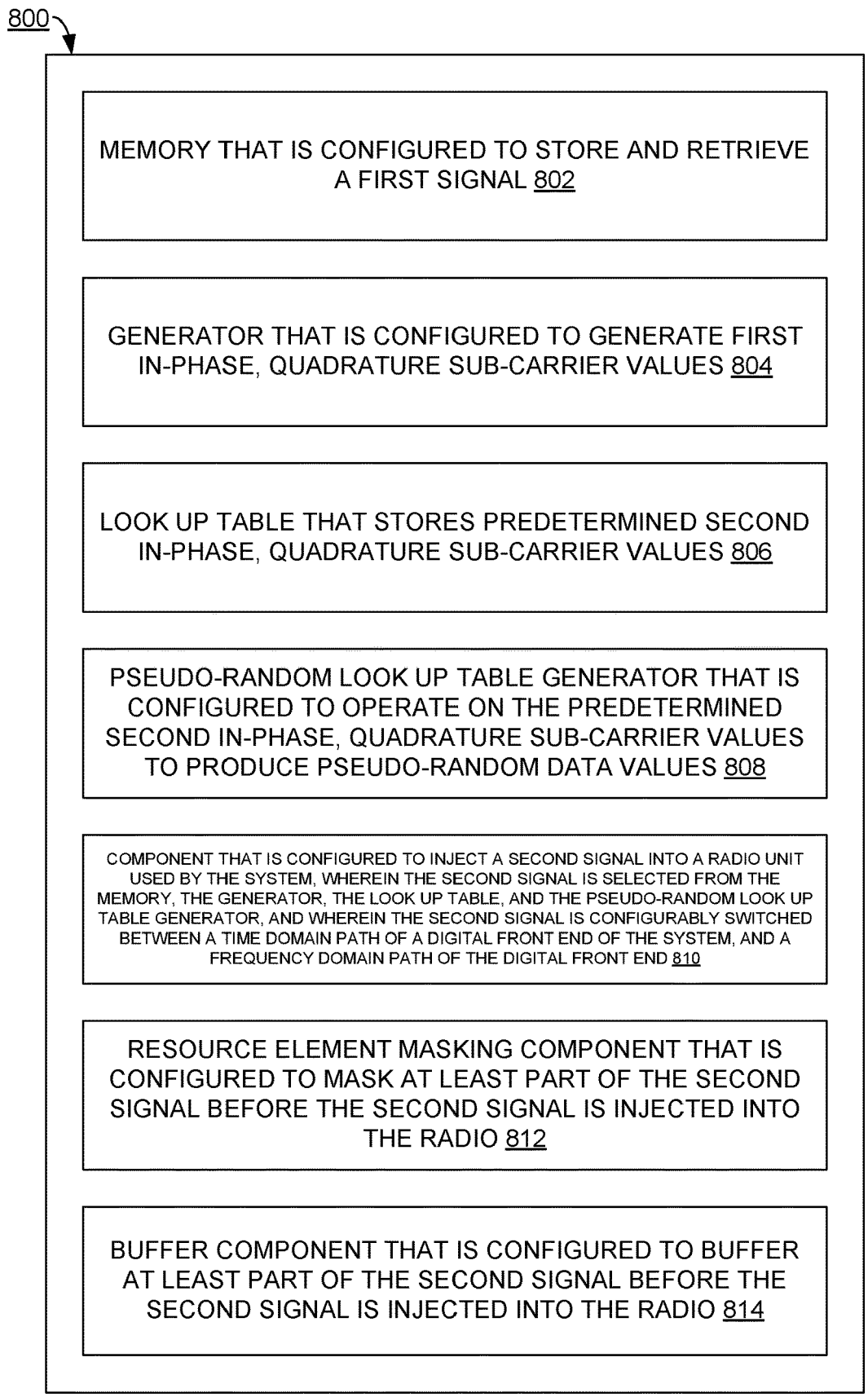
FIG. 8 illustrates another example system architecture that can facilitate custom signal data generation in a radio system, in accordance with an embodiment of this disclosure.

FIG. 8 illustrates another example system architecture 800 that can facilitate custom signal data generation in a radio system, in accordance with an embodiment of this disclosure. In some examples, part(s) of system architecture 800 can be used to implement part(s) of system architecture 100 of FIG. 1, system architecture 200 of FIG. 2, system architecture 300 of FIG. 3, system architecture 400 of FIG. 4, and/or system architecture 500.

System architecture 800 comprises memory that is configured to store and retrieve a first signal 802 (which can be similar to memory that is configured to store and retrieve a first signal 602 of FIG. 6); generator that is configured to generate first in-phase, quadrature sub-carrier values 804 (which can be similar to generator that is configured to generate first in-phase, quadrature sub-carrier values 604 of FIG. 6); look up table that stores predetermined second in-phase, quadrature sub-carrier values 806 (which can be similar to look up table that stores predetermined second in-phase, quadrature sub-carrier values 606 of FIG. 6); pseudo-random look up table generator that is configured to operate on the predetermined second in-phase, quadrature sub-carrier values to produce pseudo-random data values 808 (which can be similar to pseudo-random look up table generator that is configured to operate on the predetermined second in-phase, quadrature sub-carrier values to produce pseudo-random data values 608 of FIG. 6); component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 810 (which can be similar to component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 610 of FIG. 6); resource element masking component that is configured to mask at least part of the second signal before the second signal is injected into the radio 812 (which can be similar to resource element masking component that is configured to mask at least part of the second signal before the second signal is injected into the radio 712 of FIG. 7); and buffer component that is configured to buffer at least part of the second signal before the second signal is injected into the radio 814.

In some examples, buffer component that is configured to buffer at least part of the second signal before the second signal is injected into the radio 814 can be similar to buffer 114 of FIG. 1, and/or a portion of custom signal data memory, generation, masking, and buffer 202 of FIG. 2 that handles buffering.

Figure 9:
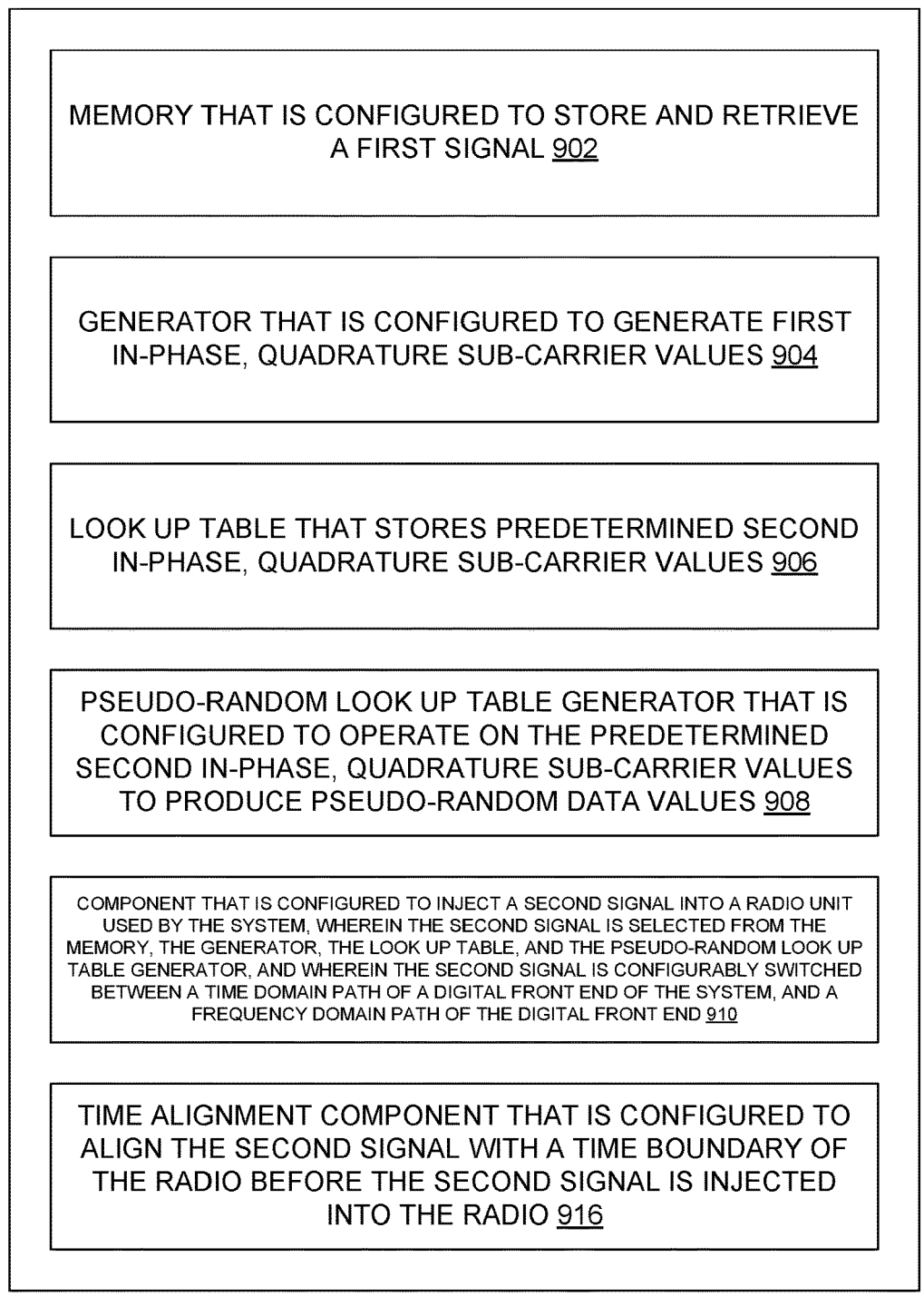
FIG. 9 illustrates another example system architecture that can facilitate custom signal data generation in a radio system, in accordance with an embodiment of this disclosure.

FIG. 9 illustrates another example system architecture 900 that can facilitate custom signal data generation in a radio system, in accordance with an embodiment of this disclosure. In some examples, part(s) of system architecture 900 can be used to implement part(s) of system architecture 100 of FIG. 1, system architecture 200 of FIG. 2, system architecture 300 of FIG. 3, system architecture 400 of FIG. 4, and/or system architecture 500.

System architecture 900 comprises memory that is configured to store and retrieve a first signal 902 (which can be similar to memory that is configured to store and retrieve a first signal 602 of FIG. 6); generator that is configured to generate first in-phase, quadrature sub-carrier values 904 (which can be similar to generator that is configured to generate first in-phase, quadrature sub-carrier values 604 of FIG. 6); look up table that stores predetermined second in-phase, quadrature sub-carrier values 906 (which can be similar to look up table that stores predetermined second in-phase, quadrature sub-carrier values 606 of FIG. 6); pseudo-random look up table generator that is configured to operate on the predetermined second in-phase, quadrature sub-carrier values to produce pseudo-random data values 908 (which can be similar to pseudo-random look up table generator that is configured to operate on the predetermined second in-phase, quadrature sub-carrier values to produce pseudo-random data values 608 of FIG. 6); component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 910 (which can be similar to component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 610 of FIG. 6); and time alignment component that is configured to align the second signal with a time boundary of the radio before the second signal is injected into the radio 916.

In some examples, time alignment component that is configured to align the second signal with a time boundary of the radio before the second signal is injected into the radio 916 can be similar to time alignment 118 of FIG. 1, and/or time alignment 218 of FIG. 2.

Figure 10:
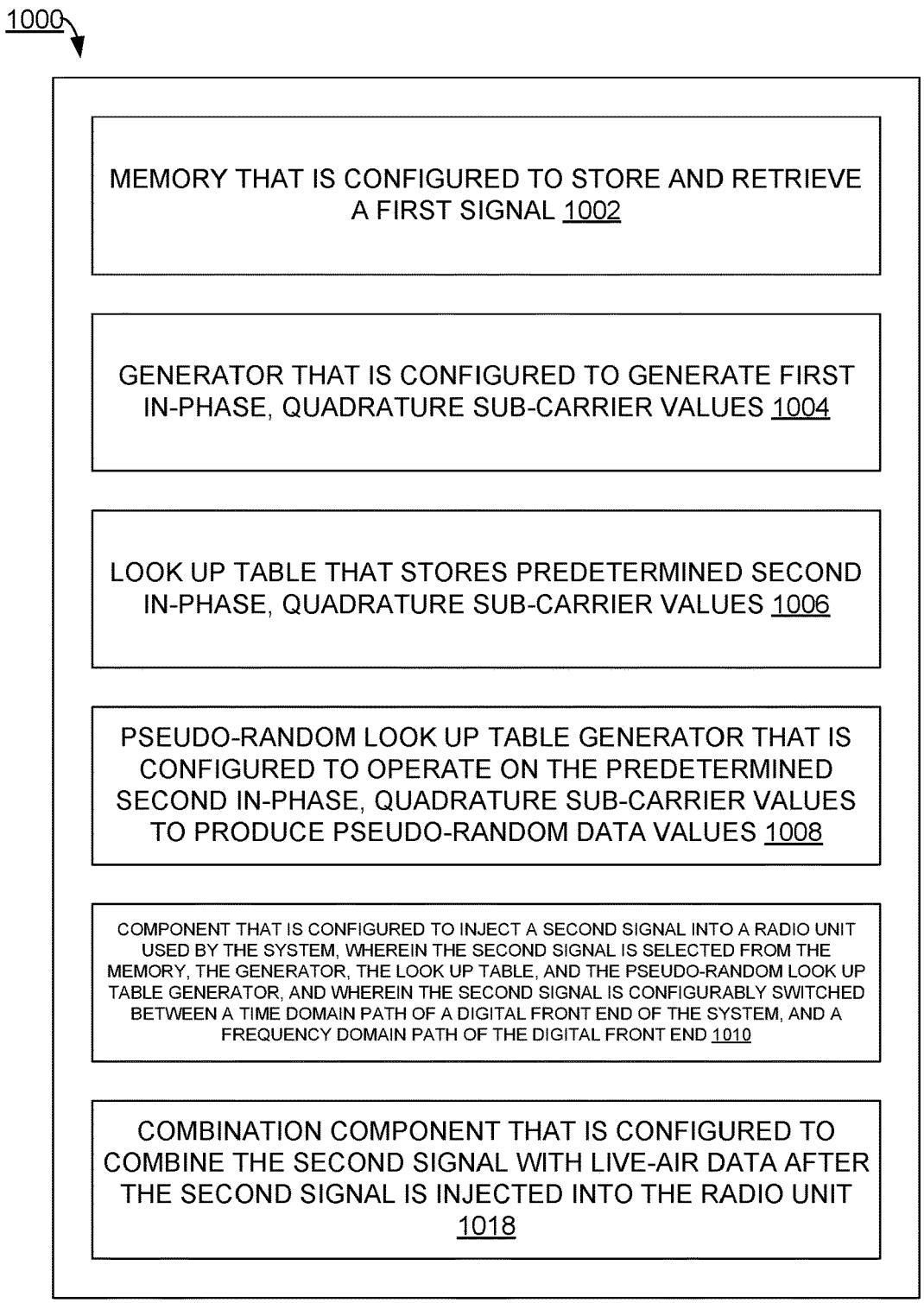
FIG. 10 illustrates another example system architecture that can facilitate custom signal data generation in a radio system, in accordance with an embodiment of this disclosure.

FIG. 10 illustrates another example system architecture 1000 that can facilitate custom signal data generation in a radio system, in accordance with an embodiment of this disclosure. In some examples, part(s) of system architecture 1000 can be used to implement part(s) of system architecture 100 of FIG. 1, system architecture 200 of FIG. 2, system architecture 300 of FIG. 3, system architecture 400 of FIG. 4, and/or system architecture 500.

System architecture 1000 comprises memory that is configured to store and retrieve a first signal 1002 (which can be similar to memory that is configured to store and retrieve a first signal 602 of FIG. 6); generator that is configured to generate first in-phase, quadrature sub-carrier values 1004 (which can be similar to generator that is configured to generate first in-phase, quadrature sub-carrier values 604 of FIG. 6); look up table that stores predetermined second in-phase, quadrature sub-carrier values 1006 (which can be similar to look up table that stores predetermined second in-phase, quadrature sub-carrier values 606 of FIG. 6); pseudo-random look up table generator that is configured to operate on the predetermined second in-phase, quadrature sub-carrier values to produce pseudo-random data values 1008 (which can be similar to pseudo-random look up table generator that is configured to operate on the predetermined second in-phase, quadrature sub-carrier values to produce pseudo-random data values 608 of FIG. 6); component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 1010 (which can be similar to component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end 610 of FIG. 6); and combination component that is configured to combine the second signal with live-air data after the second signal is injected into the radio unit 1018.

In some examples, combination component that is configured to combine the second signal with live-air data after the second signal is injected into the radio unit 1018 can take the second signal from one or more of look up table 102; pseudo-random look up table generator 104; generator 106; and memory 108 of FIG. 1, and/or custom signal data memory, generation, masking, and buffer 202 of FIG. 2 and combine it with live-air data (sometimes referred to as live-air data) received from a distributed unit.

Figure 11:
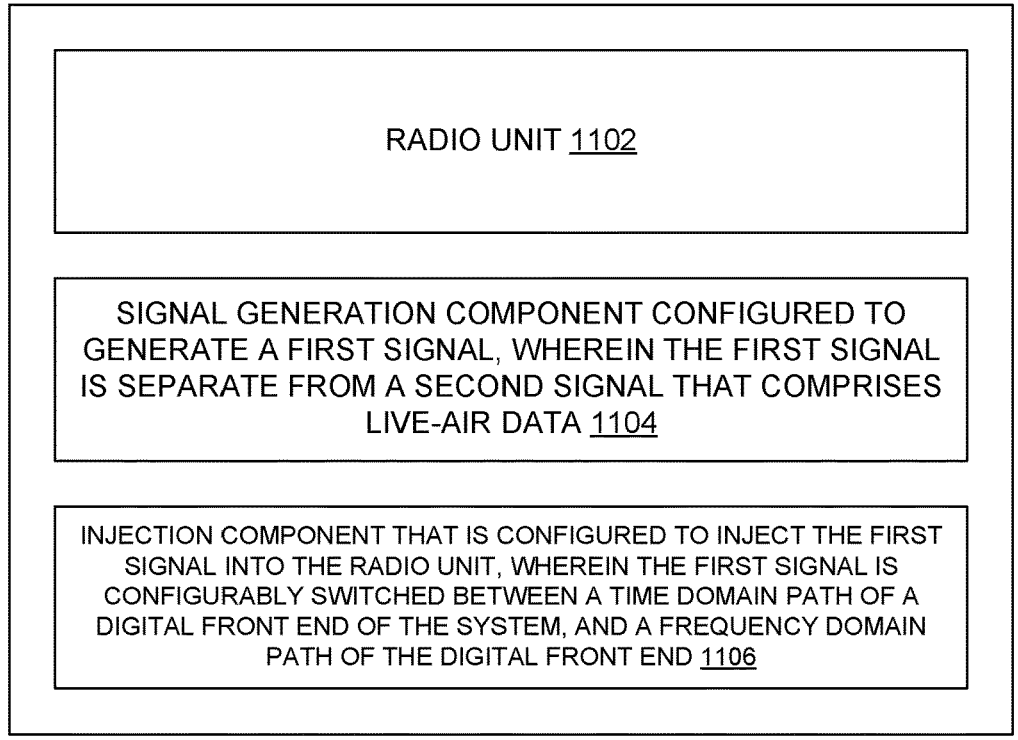
FIG. 11 illustrates another example system architecture that can facilitate custom signal data generation in a radio system, in accordance with an embodiment of this disclosure.

FIG. 11 illustrates another example system architecture 1100 that can facilitate custom signal data generation in a radio system, in accordance with an embodiment of this disclosure. In some examples, part(s) of system architecture 1000 can be used to implement part(s) of system architecture 100 of FIG. 1, system architecture 200 of FIG. 2, system architecture 300 of FIG. 3, system architecture 400 of FIG. 4, and/or system architecture 500.

System architecture 1100 comprises radio unit 1102; signal generation component configured to generate a first signal, wherein the first signal is separate from a second signal that comprises live-air data 1104; and injection component that is configured to inject the first signal into the radio unit, wherein the first signal is configurably switched between a time domain path of a digital front end of the system, and a frequency domain path of the digital front end 1106.

In some examples, radio unit 1102 can be similar to system architecture 100 of FIG. 1, system architecture 200 of FIG. 2, and/or a radio unit of system architecture 500. In some examples, signal generation component configured to generate a first signal, wherein the first signal is separate from a second signal that comprises live-air data 1104 can be similar to custom signal data memory, generation, masking, and buffer 202 of FIG. 2. In some examples, injection component that is configured to inject the first signal into the radio unit, wherein the first signal is configurably switched between a time domain path of a digital front end of the system, and a frequency domain path of the digital front end 1106 can be similar to tap point select 132 of FIG. 1, where tap point select is configured to inject a signal at a tap point in a frequency domain of a radio unit and also a tap point in a time domain of the radio unit.

In some examples, signal insertion component is configured to insert the first signal into the first radio in a frequency domain portion of a down link chain of the first radio unit.

FIG. 12 illustrates another example system architecture 1200 that can facilitate custom signal data generation in a radio system, in accordance with an embodiment of this disclosure. In some examples, part(s) of system architecture 1000 can be used to implement part(s) of system architecture 100 of FIG. 1, system architecture 200 of FIG. 2, system architecture 300 of FIG. 3, system architecture 400 of FIG. 4, and/or system architecture 500.

System architecture 1200 comprises radio unit 1202 (which can be similar to radio unit 1102 of FIG. 11); signal generation component configured to generate a first signal, wherein the first signal is separate from a second signal that comprises live-air data 1204 (which can be similar to signal generation component configured to generate a first signal, wherein the first signal is separate from a second signal that comprises live-air data 1104 of FIG. 11); injection component that is configured to inject the first signal into the radio unit, wherein the first signal is configurably switched between a time domain path of a digital front end of the system, and a frequency domain path of the digital front end 1206 (which can be similar to injection component that is configured to inject the first signal into the radio unit, wherein the first signal is configurably switched between a time domain path of a digital front end of the system, and a frequency domain path of the digital front end 1106 of FIG.

11); and time alignment component that is configured to trigger and time-align the first signal prior to being inserted into the first radio 1208.

In some examples, time alignment component that is configured to trigger and time-align the first signal prior to being inserted into the first radio 1208 can be similar to time alignment 118 of FIG. 1, and/or time alignment 218 of FIG. 2.

In some examples, time alignment component 1208 is configured to time-align the first signal on a symbol-by-symbol basis in the frequency domain.

Example Process Flows

FIG. 13 illustrates an example process flow 1300 that can facilitate custom signal data generation in a radio system, in accordance with an embodiment of this disclosure. In some examples, one or more embodiments of process flow 1300 can be implemented by system architecture 100 of FIG. 1, system architecture 200 of FIG. 2, system architecture 300 of FIG. 3, system architecture 400 of FIG. 4, and/or system architecture 500.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1400 of FIG. 14, process flow 1500 of FIG. 15, and/or process flow 1600 of FIG. 16.

Process flow 1300 begins with 1302, and moves to operation 1304. Operation 1304 depicts selecting a first signal from, a memory that is configured to store and retrieve a second signal, a generator that is configured to generate first in-phase, quadrature sub-carrier values, a look up table that stores predetermined second in-phase, quadrature sub-carrier values, and a pseudo-random look up table generator that is configured to operate on the predetermined second in-phase, quadrature sub-carrier values to produce pseudo-random data values.

That is, in some examples, the signal can be selected from look up table 102; pseudo-random look up table generator 104; generator 106; and memory 108 of FIG. 1.

In some examples, the predetermined second in-phase, quadrature sub-carrier values represent respective components of a constellation of a respective modulation coding scheme level. That is, the look up table can store values of this type.

In some examples, the pseudo-random look up table generator is configured to select values from the look up table randomly to generate a resource block matrix symbol of signal data.

In some examples, the generator is configured to generate signed data pairs of arbitrary sub carrier values for a selected multi carrier system.

In some examples, data representing the first signal comprises live-air signal data representing a live-air signal used by the radio system. In some examples, the first signal comprises custom-only data that is maintained separate from live-air signal data representing a live-air signal used by the radio system. That is, live-air data can be used according to the present techniques, by itself, and/or in a hybrid with an injected custom signal.

After operation 1304, process flow 1300 moves to operation 1306.

Operation 1306 depicts injecting the first signal into a radio unit used by the system, wherein the second signal is configurably switched between a time domain path of a digital front end of the system, and a frequency domain path of the digital front end. In some examples, this can be performed by tap point select 132 of FIG. 1; and/or tap point select 232 of FIG. 2.

After operation 1306, process flow 1300 moves to 1308, where process flow 1300 ends.

FIG. 14 illustrates another example process flow 1400 that can facilitate custom signal data generation in a radio system, in accordance with an embodiment of this disclosure. In some examples, one or more embodiments of process flow 1400 can be implemented by system architecture 100 of FIG. 1, system architecture 200 of FIG. 2, system architecture 300 of FIG. 3, system architecture 400 of FIG. 4, and/or system architecture 500.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 1300 of FIG. 13, process flow 1500 of FIG. 15, and/or process flow 1600 of FIG. 16.

Process flow 1400 begins with 1402, and moves to operation 1404. Operation 1404 depicts selecting a first custom signal. This can be performed in a similar manner as operation 1304 of FIG. 13.

After operation 1404, process flow 1400 moves to operation 1406.

Operation 1406 depicts combining data representing the first custom signal with live-air signal data representing a live-air signal used by radio. In some examples, operation 1406 can be implemented with combination component that is configured to combine the second signal with live-air data after the second signal is injected into the radio unit 1018 of FIG. 10.

After operation 1406, process flow 1400 moves to 1408, where process flow 1400 ends.

FIG. 15 illustrates another example process flow 1500 that can facilitate custom signal data generation in a radio system, in accordance with an embodiment of this disclosure. In some examples, one or more embodiments of process flow 1500 can be implemented by system architecture 100 of FIG. 1, system architecture 200 of FIG. 2, system architecture 300 of FIG. 3, system architecture 400 of FIG. 4, and/or system architecture 500.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of one or more of process flow 1300 of FIG. 13, process flow 1400 of FIG. 14, and/or process flow 1600 of FIG. 16.

Process flow 1500 begins with 1502, and moves to operation 1504. Operation 1504 depicts reading a third signal from the radio system, wherein the third signal is generated based on the first signal. That is, where the first signal is a custom signal that is injected into a radio system, the third signal can be a version of that signal that is read elsewhere in the radio system, after the radio system has manipulated the first signal.

After operation 1504, process flow 1500 moves to operation 1506.

Operation 1506 depicts determining a performance metric of the radio system based on a comparison of the first signal and the third signal. In some examples, operation 1506 can be performed in a similar manner as analysis 514A, analysis 514B, and/or analysis 514C.

After operation 1506, process flow 1500 moves to 1508, where process flow 1500 ends.

Figure 16:
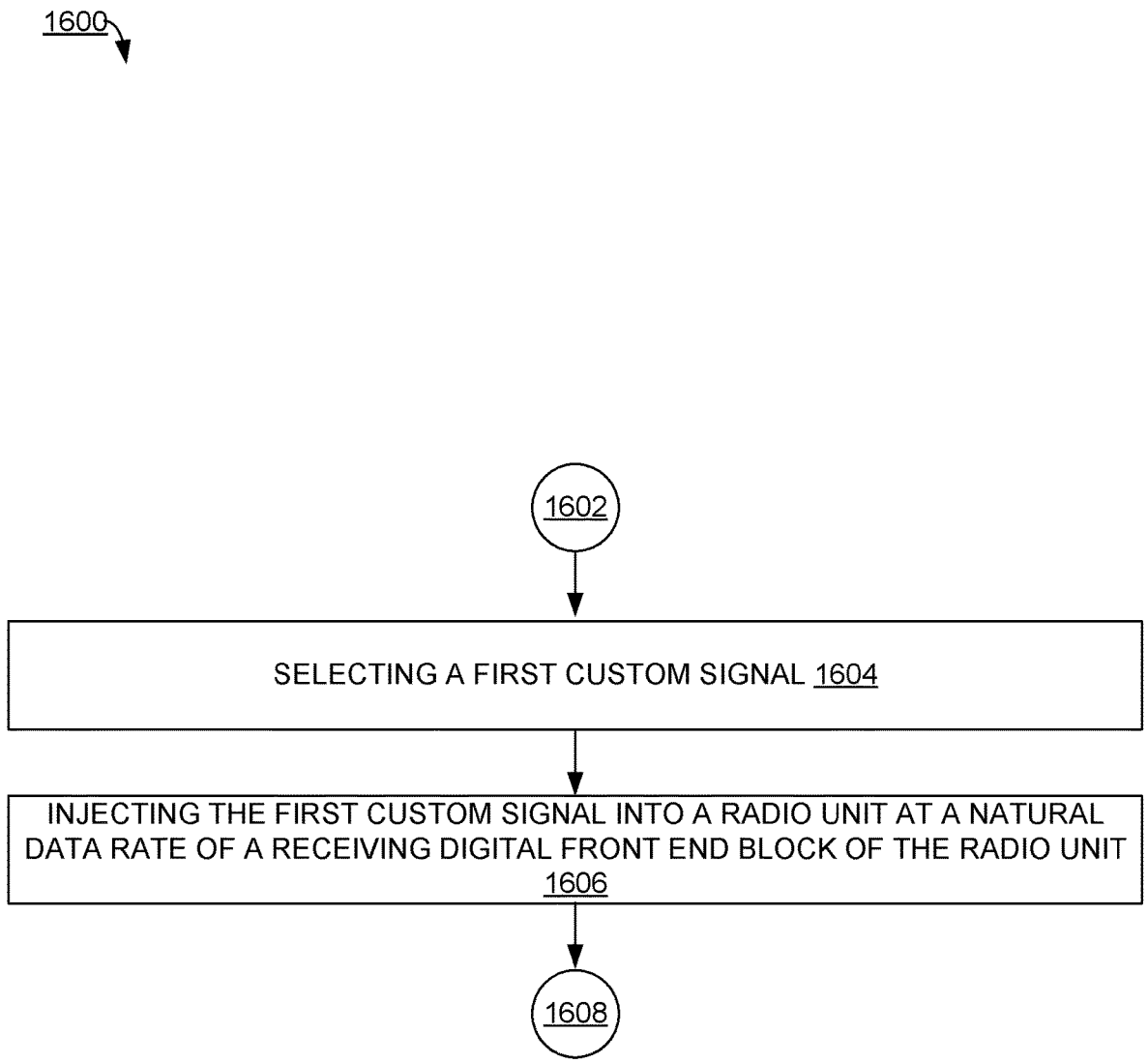
FIG. 16 illustrates another example process flow that can facilitate custom signal data generation in a radio system, in accordance with an embodiment of this disclosure.

FIG. 16 illustrates another example process flow 1600 that can facilitate custom signal data generation in a radio system, in accordance with an embodiment of this disclosure. In some examples, one or more embodiments of process flow 1600 can be implemented by system architecture 100 of FIG. 1, system architecture 200 of FIG. 2, system architecture 300 of FIG. 3, system architecture 400 of FIG. 4, and/or system architecture 500.

It can be appreciated that the operating procedures of process flow 1600 are example operating procedures, and that there can be embodiments that implement more or fewer operating procedures than are depicted, or that implement the depicted operating procedures in a different order than as depicted. In some examples, process flow 1600 can be implemented in conjunction with one or more embodiments of one or more of process flow 1300 of FIG. 13, process flow 1400 of FIG. 14, and/or process flow 1500 of FIG. 15.

Process flow 1600 begins with 1602, and moves to operation 1604. Operation 1604 depicts selecting a first custom signal. That is, in some examples, the first custom signal can be selected from one (or a combination of) look up table 102; pseudo-random look up table generator 104; generator 106; and/or memory 108 of FIG. 1; or look up table 302; pseudo-random look up table generator 304; generator 306; memory 308 of FIG. 3.

After operation 1604, process flow 1600 moves to operation 1606.

Operation 1606 depicts injecting the first signal into the radio system at a natural data rate of a receiving digital front end block of the radio unit. That is, in some examples, in the time domain, custom signal injection can be performed for an arbitrary number of samples, which can be as small as a one-sample period.

Put another way, the granularity of the injected signal can be on the order of a single sample according to a time base or sampling rate of the radio unit. In some examples, operation 1606 can comprise injecting the first signal into the radio system at a natural sampling rate of a receiving digital front end block of the radio unit After operation 1606, process flow 1600 moves to 1608, where process flow 1600 ends.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory that is configured to store and retrieve a first signal;
a generator that is configured to generate first in-phase, quadrature sub-carrier values;
a look up table that stores predetermined second in-phase, quadrature sub-carrier values;
a pseudo-random look up table generator that is configured to operate on the predetermined second in-phase, quadrature sub-carrier values to produce pseudo-random data values; and
a component that is configured to inject a second signal into a radio unit used by the system, wherein the second signal is selected from the memory, the generator, the look up table, and the pseudo-random look up table generator, and wherein the second signal is configurably switched between a time domain path of a digital front end of the system, and a frequency domain path of the digital front end.

2. The system of claim 1, wherein the component is configured to inject the second signal into a time domain path of the radio unit.

3. The system of claim 1, wherein the component is configured to inject the second signal into a frequency domain path of the radio unit.

4. The system of claim 1, further comprising:
a resource element masking component that is configured to mask at least part of the second signal before the second signal is injected into the radio unit.

5. The system of claim 4, further comprising:
a buffer component that is configured to buffer at least part of the second signal before the second signal is injected into the radio unit.

6. The system of claim 1, further comprising:
a time alignment component that is configured to align the second signal with a time boundary of the radio before the second signal is injected into the radio unit.

7. The system of claim 1, further comprising:
a combination component that is configured to combine the second signal with live-air data after the second signal is injected into the radio unit.

8. A method, comprising:
selecting, by a system comprising a processor, a first signal from,
a memory that is configured to store and retrieve a second signal,
a generator that is configured to generate first in-phase, quadrature sub-carrier values,
a look up table that stores predetermined second in-phase, quadrature sub-carrier values, and
a pseudo-random look up table generator that is configured to operate on the predetermined second in-phase, quadrature sub-carrier values to produce pseudo-random data values; and
injecting, by the system, the first signal into a radio unit used by the system, wherein the second signal is configurably switched between a time domain path of a digital front end of the system, and a frequency domain path of the digital front end.

9. The method of claim 8, wherein the predetermined second in-phase, quadrature sub-carrier values represent respective components of a constellation of a respective modulation coding scheme level.

10. The method of claim 8, wherein the pseudo-random look up table generator is configured to select values from the look up table randomly to generate a resource block matrix of signal data.

11. The method of claim 8, wherein the generator is configured to generate signed data pairs of arbitrary sub carrier values for a selected multi carrier system.

12. The method of claim 8, further comprising:
combining, by the system, data representing the first signal with live-air signal data representing a live-air signal used by system.

13. The method of claim 8, wherein data representing the first signal comprises live-air signal data representing a live-air signal used by the system.

14. The method of claim 8, wherein the first signal comprises custom-only data that is maintained separate from live-air signal data representing a live-air signal used by the radio unit.

15. The method of claim 8, further comprising:
reading, by the system, a third signal from the radio unit, wherein the third signal is generated based on the first signal; and
determining, by the system, a performance metric of the radio unit based on a comparison of the first signal and the third signal.

16. The method of claim 8, further comprising:
injecting, by the system, the first signal into the radio unit at a natural data rate of a receiving digital front end block of the radio unit.

17. An apparatus, comprising:
a radio unit;
a signal generation component configured to generate a first signal, wherein the first signal is separate from a second signal that comprises live-air data; and
an injection component that is configured to inject the first signal into the radio unit, wherein the first signal is configurably switched between a time domain path of a digital front end of the apparatus, and a frequency domain path of the digital front end.

18. The apparatus of claim 17, further comprising:
a time alignment component that is configured to trigger and time-align the first signal prior to being inserted into the radio unit.

19. The apparatus of claim 18, wherein the time alignment component is configured to time-align the first signal on a symbol-by-symbol basis in the frequency domain path.

20. The apparatus of claim 17, wherein the injection component is configured to insert the first signal into the first radio unit in a frequency domain portion of a down link chain of the radio unit.

\* \* \* \* \*